United States Patent [19]

Stenhall

[11] 4,150,086

[45] Apr. 17, 1979

[54] METHOD FOR MANUFACTURING SLIDE FASTENER FILAMENT

[76] Inventor: Turo Stenhall, 32740 Aetsa, Finland

[21] Appl. No.: 826,170

[22] Filed: Aug. 19, 1977

Related U.S. Application Data

[62] Division of Ser. No. 662,415, Mar. 1, 1976, Pat. No. 4,052,145.

[30] Foreign Application Priority Data

Mar. 5, 1975 [FI] Finland .................................. 750640

[51] Int. Cl.² ........................ B29D 5/00; B29C 17/02
[52] U.S. Cl. .................................. 264/285; 264/294; 264/295; 264/320; 264/339
[58] Field of Search ............... 264/280, 294, 295, 320, 264/322, 339, 285; 24/205.13 C, 205.1 C, 205.16 C; 425/814, 391, 392, 397

[56] References Cited

U.S. PATENT DOCUMENTS

| | | | |
|---|---|---|---|
| 3,197,537 | 7/1965 | Hansen | 425/814 |
| 3,412,438 | 11/1968 | Sim | 24/205.13 C |
| 3,672,805 | 6/1972 | Porepp | 425/814 |
| 3,787,164 | 1/1974 | Jakob | 425/814 |

*Primary Examiner*—W. E. Hoag
*Attorney, Agent, or Firm*—Steinberg & Blake

[57] ABSTRACT

A method for manufacturing part of a slide fastener includes the steps of deforming an initially substantially straight filament portion into a filament portion of V-shaped configuration having a pair of legs which meets at a crest of the deformed portion of V-shaped configuration. Simultaneously the deformed V-shaped portion of the filament is compressed at its crest to form a tooth of the slide fastener at this crest of the V-shaped portion. Immediately thereafter the legs of the V-shaped portion are pushed together while situating them in side-by-side relation and while displacing these legs into a tooth gap between a pair of teeth of a rotary gear.

3 Claims, 8 Drawing Figures

METHOD FOR MANUFACTURING SLIDE FASTENER FILAMENT

CROSS REFERENCE TO RELATED APPLICATION

This application is a division of copending application Ser. No. 662,415, filed Mar. 1, 1976 now U.S. Pat. No. 4,052,145.

BACKGROUND OF THE INVENTION

The present invention relates to methods for manufacturing for slide fasteners coiled filaments which have interlocking teeth of the slide fastener.

Thus, the present invention relates to a method for manufacturing elongated coiled slide fastener filaments which are continuous and preferably made of a plastic material. The invention relates to that type of method wherein the coiled filament is formed in a setting gear wheel the teeth of which are utilized, as well as the gaps between these teeth, in the formation of the coil which have the configuration of a flattened spiral or another configuration which will have an equivalent effect. The flattened spiral which forms the coiled filament has sharp kinks or bends where the interlocking teeth of the slide member are situated.

At the present time there are a number of different known methods for manufacturing slide fasteners of the general type. In general, the known methods utilize a principle according to which the filament is wound in a number of different ways and by various different structures around consecutive teeth of a setting gear wheel, although it is also known to utilize a filament which is preliminarily bent into a spiral or zig-zag configuration separately from the gear wheel. In this latter event, the preliminarily shaped blank filament is fed onto the setting gear wheel to be heat treated so as to relieve the stresses in the row of convolutions of the coiled filament. There are also known methods according to which initially depressions are impressed, as by hacking, into the filament, these depressions being provided periodically at equal intervals along the filament, and the filament blank which is obtained in this way is then fed in an enforced manner onto the setting gear wheel so that as the filament is bent the initially formed depressions provide the consecutive locking teeth situated along the respective coils of the filament.

It is because of drawbacks which are present in the above methods that the present invention has been provided.

With respect to the present state of the art, reference may be made to Finnish Pat. No. 36,574, Swedish Pat. No. 187,831, Danish Pat. No. 123,684 and the German Offenlegungschrift No. 2,150,350.

According to the above Finnish Pat. No. 36,574, a slide-fastener manufacturing method is disclosed wherein the continuous filament is first given a planar zig-zag configuration with the locking teeth being provided at the sharp bands of this filament. The blank which is thus achieved is then fed onto the setting gear wheel in an enforced manner. The primary drawback of this type of method resides in the difficulties which are encountered during transport of the filament blank and during the feeding thereof onto the setting gear wheel, as well as difficulties encountered with respect to providing a bend in the filament at the proper point for forming a loop blank.

With respect to Swedish Pat. No. 187,831, there is disclosed a method wherein a setting wheel is also employed, with a filament feeder moving in the axial direction of the wheel and operating adjacent the outer circumference of the wheel. In a direction which is transverse to the direction of movement of the filament feeder there is a gripping pin which moves in such a way that the filament is wound around an end of this gripping pin during movement of the filament feeder. This filament feeder carries a stop which at the extreme end of the range of movement of the filament feeder pushes the filament loop encircling the end of the gripping pin and shapes it into a locking tooth. The drawback of this method resides in the complex paths of movement of the filament feeder and above all of the gripping pin, as well as in the difficulties encountered in providing the required synchronization of the movement of the different components.

With respect to Danish Pat. No. 123,684, referred to above, there is disclosed an apparatus intended to manufacture a slide fastener and having a first pair of rolls used to impress into the filament preliminary rudimentary curves and locking teeth. This same pair of rolls feed, in an enforced manner, the resulting filament onto the setting wheel which carries at its circumference a set of consecutive pins with the filament being fed into the spaces between these pins by way of a special piston which is arranged to reciprocate radially with respect to the setting wheel. The drawbacks with respect to this method and procedure are primarily the same as those referred to above in connection with Finnish Pat. No. 36,574.

There is also a publicly available Finnish patent application No. 3247/67, corresponding to Swedish announcement publication No. 324,075, wherein there is disclosed a slide-fastener manufacturing apparatus according to which the filament is wound so as to be contiguous with teeth of the gear setting wheel, utilizing a particular feeding means while at the same time a depression which produces the locking tooth is impressed into the filament. This apparatus has a stop which is fixed to the gear setting wheel and has its working face situated in a plane which is substantially flush with the innermost parts of the gaps between the teeth of the gear setting wheel. Adjacent to this setting wheel is a special filament guide which has a filament feeding channel through which the plastic filament passes. The filament guide has a substantially U-shaped punch projection which performs the initial pressing of the locking teeth against a stop when the filament guide is moved inwardly, radially toward the axis of the gear setting wheel. At the same time, the outer margin of the filament guide pushes the preceding filament section into a tooth gap of the gear setting wheel, whereupon the filament guide withdraws radially and subsequently moves axially, so that the filament sections are positioned side-by-side in a tooth gap. The drawback of this type of apparatus resides in the complexity of the moving parts and in the complexity of the paths of movement, as well as difficulties encountered in synchronization of the various moving components, these latter difficulties resulting in possible damage of the components.

The above method greatly resembles the method disclosed in Germany Offenlegungschrift No. 2,150,350. The only substantial difference resides in the fact that the method disclosed in the German publication requires a s particular piston which in its outward movement, radially to the setting wheel, impresses the rudimentary locking teeth to the filament while the filament guiding channel acts as a countermember in this connection. With respect to the drawbacks of this method, the above points with respect to the preceding disclosure also apply.

SUMMARY OF THE INVENTION

It is accordingly a primary object of the present invention to provide a method which will avoid to the greatest possible extent the above drawbacks while providing a method simpler than those previously known.

It is thus an object of the present invention to provide a method according to which moving parts need only move along straight or substantially straight lines through relatively short distances.

Also it is an object of the present invention to provide a method according to which the reliability is increased and the risk of breaking a filament is reduced while at the same time improper shaping of the filament is avoided.

It is also an object of the present invention to provide for the continuous filament of the slide fastener dimensions that can be permanently retained while in particular reducing failure of the setting gear wheel and providing the possibility of a wider range in the desired dimensional shape and dimensional accuracy of the locking teeth of the slide fastener.

It is furthermore an object of the present invention to provide a method according to which the filament need not be carried outside the gear setting wheel, with the filament being shaped immediately adjacent the gear setting wheel and the feeding onto the gear setting wheel taking place immediately after the shaping.

Thus, it is an object of the invention to provide a method according to which it becomes possible to position the filament blank on the gear setting wheel in a simpler and more reliable manner than has heretofore been possible.

It is also an object of the present invention to provide a method according to which filament need only be bent in one direction, in contrast to previously known methods according to which the filament is bent and/or pressed from several different directions.

According to the method of the invention, an initial substantially straight portion is deformed into a substantially V-shaped portion with a tooth being formed at the crest of the V-shaped portion where the legs thereof meet, and immediately upon completion of the forming of this tooth, the legs of the V-shaped portion are pushed into a tooth gap of the gear setting wheel so as to become situated beside each other.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
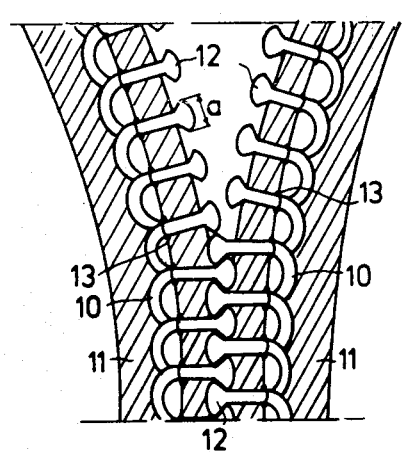
FIG. 1 is a schematic illustration of a slide fastener having filament coils manufactured according to the method of the invention, the slide fastener being shown in FIG. 1 closed at the lower part of FIG. 1 and open at the upper part of FIG. 1.

FIG. 1 illustrates part of a slide fastener manufactured with the method of the present invention, the slide fastener itself being known. The slide fastener shown in FIG. 1 includes a pair of coiled plastic filaments 10 having flattened convolutions. These coiled filaments 10 are sewn, for example by the lines of stitches 13, to a pair of tapes 11. At their inner portions which project inwardly beyond the tapes 11, the filament coils 10 have at the several convolutions the slide fastener teeth 12 which according to the movement of a conventional slider up and down the slide fastener can be moved between the locked position shown in the lower portion of FIG. 1 and the unlocked position shown in the upper portion of FIG. 1. As is indicated in FIG. 1, each tooth has a breadth a.

Figure 2:
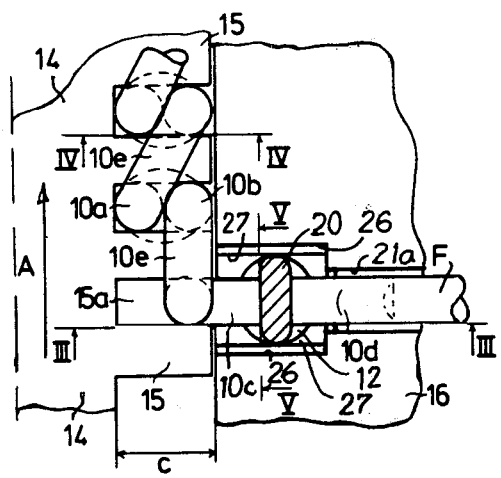
FIG. 2 is a schematic fragmentary top plan view of apparatus for performing the method of the invention.
Figure 3:
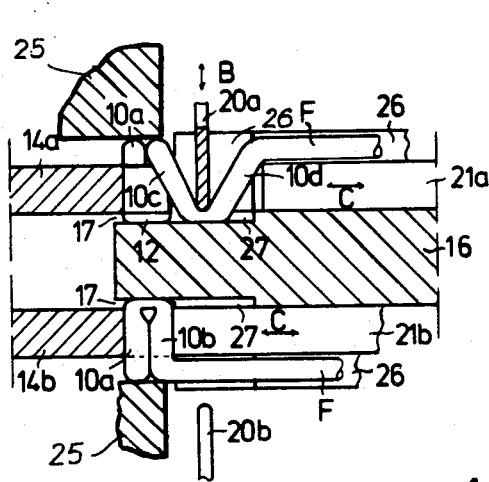
FIG. 3 is a fragmentary longitudinal sectional and schematic illustration of the structure of FIG. 2 taken along III—III of FIG. 2 in the direction of the arrows.
Figure 6:
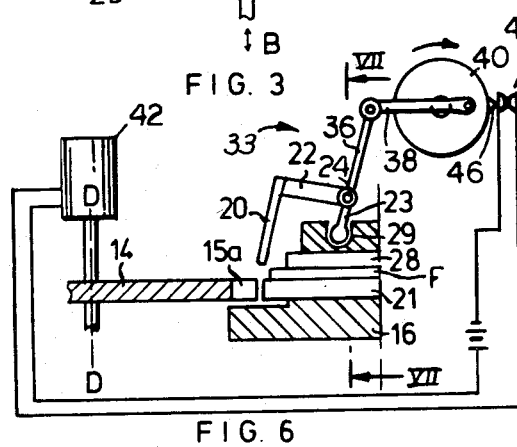
FIG. 6 is a schematic illustration of part of the structure shown at the upper portion of FIG. 3 with FIG. 6 further illustrating schematically how components are interconnected and operated.

The method of the invention illustrated in FIGS. 2-8 is capable of manufacturing a pair of coiled filaments 10, although as will be apparent from the description below, it is also possible to utilize the method of the invention in the manufacture of only one filament at a time. The filament F from which the coiled elements 10 are made is preferably a plastic filament, consisting, for example, of a suitable thermoplastic material. The filament F appropriately has a circular cross section. As is indicated in FIG. 3 in the particular method shown there are a pair of coaxial setting gear wheels 14a and 14b which have a common axis D—D shown in FIG. 6. Each of the gear setting wheels has at its periphery teeth 15 separated by tooth gaps 15a, as shown most clearly in FIG. 2. These teeth 15 as well as the tooth gaps 15a are of a substantially rectangular configuration. While the axis D—D is shown in FIG. 6 as being vertical, this axis can also be horizontal or it may have an intermediate inclined attitude.

As is best shown in FIG. 3, a stationary or fixed stop member 16 is provided, having an elongated edge portion extending with clearance into the space between the gear setting wheels 14a and 14b so that the edge portion of the stop member 16, shown at the left in FIG. 3 defines with the peripheral portions of the setting gear wheels, where the teeth thereof are located, a pair of gaps 17.

Just beyond the circumference of the wheels 14a and 14b the stop member 16 has an increased thickness while at the same time extensions of the surfaces which define the gaps 17 extend to the right, as viewed in FIG. 3, beyond the wheels 14a and 14b so as to form a pair of grooves 27. As is apparent from FIG. 5, each groove 27 has a transverse dimension determining the breadth a of the locking teeth 12 of the coil 10.

The manner in which each filament F becomes situated on the teeth of each wheel 14, corresponding to the wheels 14a and 14b, is most clearly shown in FIG. 2. Thus, within each tooth gap 15a the filament has a pair of parallel legs 10a and 10b situated in side-by-side relation, as is also clearly apparent from FIG. 4. The leg 10a is situated at the innermost part of each gap 15a. These legs 10a and 10b are interconnected by a locking tooth 12 at which the filament is flattened to a considerable extent. The leg 10a in one tooth gap is interconnected with the leg 10b in the next tooth gap by way of a filament portion 10e, as is most clearly apparent from FIG. 2. This connecting portion 10e extends along a side surface of the wheel 14 which is directed away from the gap 17.

In accordance with the present invention there is a relatively narrow deforming member or means 20 as well as a pusher or pusher means 21. The deforming means 20 and pusher means 21 are schematically illustrated in FIG. 6 from which it is apparent that they are substantially perpendicular to each other while being situated in a plane which contains the axis of the setting gear wheel 14, with these components being interconnected by a moving means 30 which is schematically illustrated in FIG. 6.

Figure 8:
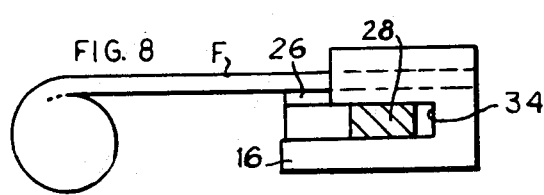
FIG. 8 is a partly sectional side elevation of part of the structure shown schematically in FIG. 7, taken along line VIII—VIII of FIG. 7 in the direction of the arrows.
Figure 7:
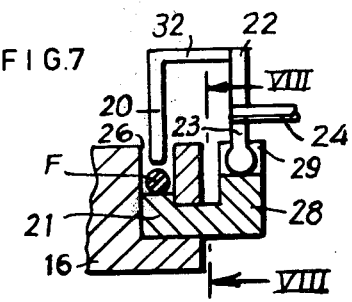
FIG. 7 is a schematic partly sectional illustration of part of the structure of FIG. 6 taken along line VII—VII of FIG. 6 in the direction of the arrows.

Referring to FIGS. 6-8, it will be seen that the elongated relatively narrow deforming means 20 has an integral horizontally extending upper arm portion 32 fixed to a lever 22 which at its end distant from the arm 32 is fixed with a rotary shaft 24 which is supported for rotary movement on any suitable unillustrated bearing structure. Thus, the shaft 24 is supported for oscillatory angular movement about its axis, and the deforming means 20 is compelled to oscillate angularly with the shaft 24. Fixed to and projecting downwardly from the lever 22, at its end distant from the arm 32, is a second lever 23 which has a bottom free and situated in a cutout 29 formed in an extension 28 of the pusher 21. As is apparent from FIGS. 7 and 8, the extension 28 extends from the pusher 21 through a slot 34 which is formed in the fixed stop member or supporting structure 16. This slot 34 may be open at its rear end, as illustrated in FIG. 8. Thus, the extension 28 by sliding in the slot 34 produces a corresponding movement of the pusher 21 in a guide slot or groove 26 which is formed in the fixed member 16. As is apparent from FIG. 2, the groove 26 is stepped so as to be wider at its region which is adjacent the teeth of the setting gear wheel 14, and this enlarged width is sufficient to accommodate the deforming member 20 while the groove 27 in which the tooth 12 is formed is situated beneath the lower end of the member 20.

The shaft 24 is fixed to a lever 36 which is in turn pivotally connected with one end of a connecting rod 38, the opposite end of which is pivotally connected with a rotary disc 40 driven about its axis in a clockwise direction, as is apparent from FIG. 3. Thus, as the disc 40 turns the shaft 24 will be oscillated about its axis, and the result is that as the deforming means 20 moves downwardly, as viewed in FIG. 6, the pusher 21 is retracted to the right, as viewed in FIG. 6, away from the setting gear wheel 14. On the other hand, when the deforming means 20 is raised, the pusher 21 is advanced toward the axis of the gear wheel 14. It is apparent that while the pusher 21 moves radially with respect to the axis of the gear wheel 14 the deforming means 20 moves substantially parallel to the axis of the gear wheel 14. The gear wheel 14 shown in FIG. 6 is turned through an increment corresponding to the distance from one tooth gap 15a to the next tooth gap 15a by way of a suitable stepping motor 42 which steps the wheel 14 through this angular increment each time a switch 44 is closed by way of a projection 46 at the periphery of the disc 40. Thus, the operation is such that when the deforming means 20 is raised to the position shown in FIG. 6 and the pusher 21 has reached the end of its radial movement toward the axis of the wheel 14, the stepping motor 42 is energized to step the wheel 14 through the angular increment required to situate the next tooth gap 15a in line with the pusher 21. The above structure shown in FIGS. 6-8 for one of the wheels 14 is also provided for the other of the wheels, although, as shown in FIG. 3, it is preferred to provide at the wheel 14b operations which are out of phase with the operations at the wheel 14a. In other words as the upper deforming means 20a of FIG. 3 moves downwardly, the lower deforming means 20b also moves downwardly, so that it is possible to interconnect the pair of deforming means and operate them simultaneously, with the pushers 21a and 21b also being interconnected so that they simultaneously move in opposite directions while the drive to the wheel 14b is such that this wheel is stepped through the required angular increment when the pusher 21b is at the end of its stroke to the left, as viewed in FIG. 3, toward the axis D—D.

Thus, as is apparent from the above description, the deforming means 20 and pusher means 21 are mechanically interconnected in such a way that their periodic movements are 180° out of phase with respect to each other. In other words when the deforming means 20 is at the end of its deforming stroke, the pusher means 21 has been retracted to its extreme outer end position, whereas when the deforming means 20 has been retracted back to its starting position the pusher means 21 has reached the end of its stroke inwardly toward the axis of the setting gear wheel. It is apparent from FIG. 3 that the pair of deforming means 20a, 20b move in a direction indicated by the arrows B while the pair of pushers 21a and 21b move in a direction indicated by the arrows C. It it thus apparent that the paths of movement of the deforming means and pusher means are substantially at right angles of each other. Each filament F is supplied from a suitable spool, for example, so as to extend therefrom along a surface of the pusher 21 while being guided in the groove 26 in which the pusher itself is guided, and thus in this way each filament F extends up to a wheel 14.

Assuming that the parts have the position shown in FIG. 3, the deforming means 20b will be displaced upwardly while simultaneously the pusher 21b is retracted to the right from the end position thereof shown in FIG. 3. Of course, in the meantime, just after the pusher 21b has reached the position shown in FIG. 3 the lower wheel 14b of FIG. 3 has been stepped through the angular increment required to situate the next empty tooth gap 15a in alignment with the pusher 21b. By the time the free end of the deforming means 20b engages the filament F, which extends along the lower groove 26 of FIG. 3 and which is guided by the lower surface of the pusher 21b, this pusher 21b has been retracted sufficiently to the right, as viewed in FIG. 3, so that it is beyond the path of movement of the deforming means 20b. Now the deforming means 20b continues to move substantially parallel to the axis D—D so as to deform the initially straight portion of filament F into a substantially V-shaped configuration thus providing the deformed filament portion with legs 10c and 10d as shown for the upper filament in FIG. 3. Simultaneously, the pusher 21b continues to be retracted and supports the filament F while it is deformed increasingly into the portion of V-shaped configuration. In the final stage of this step of the operation the components at the lower part of FIG. 3 reach a position shown for the components at the upper part of FIG. 3. At this stage in the operation the deforming means presses the filament at the crest formed between the inclined legs against the innermost surface of the groove 27 which determines the breadth a of the tooth 12 as described above and shown in FIG. 5. Thus, the deforming means compresses the crest of the V-shaped filament portion into the groove 27 so as to form the tooth 12. When the deforming means 20a and the pusher means 21a of FIG. 3 reach the position illustrated in FIG. 3, the disc 40 has turned through 180° beyond the position thereof shown in FIG. 3, so that during the continued turning of this disc 40 the deforming means will be retracted back toward its starting position and at the same time the pusher means 21a will be advanced inwardly toward the axis of the wheel 14a. As the deforming means begins to withdraw away from the filament, the spread out part of the filament which forms the locking tooth engages the fixed member 16 in the groove 27 thereof with sufficient friction to prevent the deformed filament portion from returning outwardly away from the member 16 with the retracting deforming means. The pusher 21 now begins to advance toward the axis of the setting gear wheel while the expanded or spread-out shoulder portion which forms the locking tooth slides along the groove 27 and into the gap 17 between the member 16 and the side surface of the wheel 14, at its teeth 15, directed toward the overlapping surface of the member 16 which forms the gap 17. Thus, the pusher means 21 while advancing toward the axis of the setting gear wheel pushes the legs 10a and 10b together so that they become situated in side-by-side relation while being advanced into the aligned tooth gap 15a. At the end of this movement the pusher has reached the position shown for the pusher 21b in FIG. 3, and of course it is at this time that the components shown at the lower part of FIG. 3 have the position corresponding to that shown in FIG. 6, so that now the wheel 14b of FIG. 3 is about to be stepped to advance the legs 10a and 10b together with the wheel while situating the next gap in position.

Thus, the above operations are repeated first at one side and then at the other side of the fixed stop member 16. It is to be noted that no time does the deforming means 20 or the pusher means 21 move into space occupied by the setting gear wheel. In other words the pusher 21 never moves into a tooth gap 15a, although closely approaching to the exterior peripheral surface of the setting wheel, and of course the deforming means 20 while situated adjacent the periphery of the setting wheel never is situated at a location where movement of the setting wheel can conflict with the movement of the deforming means 20. The same is true of course of the pusher means inasmuch as the latter never enters a tooth gap so that there can be no conflict between the setting gear wheel and the pusher means. Thus, none of the parts are ever in an intermeshed relationship so that the components cannot damage each other even if it should happen that somehow the required synchronization becomes deranged. The deforming means 20 and pusher means 21 will remain in proper operating condition with respect to each other inasmuch as they have been mechanically interconnected in the manner shown in FIG. 6 and described below.

Figure 4:
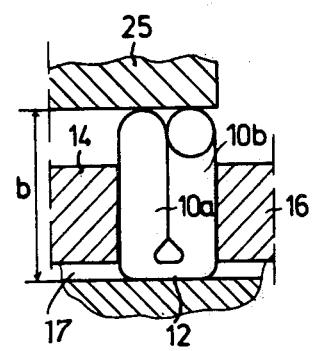
FIG. 4 is a fragmentary, schematic transverse section taken along line IV—IV of FIG. 2 in the direction of the arrows.
Figure 5:
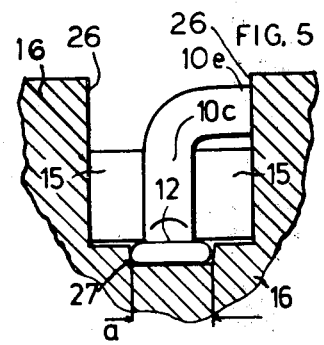
FIG. 5 is a fragmentary transverse sectional elevation of part of the structure of FIG. 2 taken along V—V of FIG. 2 in the direction of the arrows.

The precise determination of the various dimensions of the coiled filament 10 is brought about by way of features shown most clearly in FIGS. 2, 4 and 5. Thus, the breadth a of the locking tooth 12 is determined in the manner described above. The length b of each of the legs 10a and 10b is determined by a surface of a stationary stop member 25 which is situated adjacent that surface of the wheel 14 which is directed away from the gap 17. Thus, in this way the dimension b indicated in FIG. 4 is provided. The dimension c, indicated at the lower part of FIG. 2, is determined by the distance between the front surface of the fixed member 16 and the innermost part of the tooth gap 15a. It is thus apparent that by way of these parts the desired dimensions will be reliably maintained, while on the other hand it is a simple matter to adjust the position of elements such as elements 25 and 16 with respect to the wheel 14 so as to vary these dimensions as desired.

What is claimed is:

1. In a method for manufacturing part of a slide fastener from a filament wherein an initially substantially straight filament portion initially engages a side surface of a rotary gear and is initially situated in the plane of said gear side surface, the steps of deforming said initially substantially straight filament portion into a filament portion of V-shaped configuration having a pair of legs which meet at a crest of the deformed portion of V-shaped configuration, while simultaneously displacing a deforming member in a direction substantially parallel to the axis of said gear through a plane which includes said side surface thereof toward an opposed side surface of said gear along a path situated outwardly beyond said tooth gap, said deforming member compressing the deformed V-shaped portion of the filament at said crest thereof against a stop surface parallel to and spaced slightly beyond said opposed side surface of said gear to form a tooth of the slide fastener at the crest of the V-shaped portion, and immediately thereafter displacing a pusher which is situated in the same plane as said gear radially toward said tooth gap for pushing said legs of said V-shaped portion together while situating them into side-by-side relation and while displacing said legs into a tooth gap defined between a pair of teeth of said rotary gear, and providing for said deforming member and pusher movements which are substantially 180° out of phase with respect to each other with said deforming member advancing toward said stop surface while said pusher is displaced radially away from said axis of said gear while said deforming member is retracted back away from said stop surface while said pusher member is advanced substantially radially toward said axis to push the legs of the V-shaped portion of the filament into the tooth gap.

2. In a method as recited in claim 1 and including the step of carrying out said deforming and pushing steps on a filament portion which is an extension of a filament portion which extends along said first-mentioned side surface of said gear from said tooth gap to an adjoining tooth gap in which a previously deformed filament portion is situated with the legs of the previously deformed filament portion situated in side-by-side relation in said adjoining tooth gap and with the previously formed tooth situated between said opposed side surface of said gear and said stop surface and with the tooth which is formed against said stop surface being displaced into the space between said stop surface and said opposed side surface of said gear during pushing of said legs of said V-shaped portion into side-by-side relation.

3. In a method as recited in claim 2 and including the step of guiding an extension of the deformed filament portion with a surface of said pusher during movement thereof toward said axis as well as during retraction thereof away from said axis.

* * * * *